(12) United States Patent
Iizuka et al.

(10) Patent No.: US 6,517,784 B1
(45) Date of Patent: Feb. 11, 2003

(54) EXHAUST GAS PURIFYING APPARATUS FOR AN INTERNAL COMBUSTION ENGINE

(75) Inventors: Hidéhiro Iizuka, Tsuchiura (JP); Osamu Kuroda, Hitachi (JP); Toshio Ogawa, Takahagi (JP); Akira Kato, Mito (JP); Hiroshi Miyadera, Hitachi (JP); Yuichi Kitahara, Hitachinaka (JP); Hiroatsu Tokuda, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/588,711

(22) Filed: Jun. 7, 2000

Related U.S. Application Data

(62) Division of application No. 08/585,055, filed on Jan. 11, 1996, now Pat. No. 6,093,377.

(30) Foreign Application Priority Data

Jan. 10, 1995  (JP) .............................................. 7-001704

(51) Int. Cl.$^7$ .......................... B01D 53/56; F01N 3/18; F01N 3/20
(52) U.S. Cl. ........................ 422/177; 422/105; 422/180; 60/285; 60/299; 502/325; 502/302
(58) Field of Search ................................. 422/171, 172, 422/177, 180, 105; 60/297, 299, 285; 502/302, 304, 325, 339

(56) References Cited

U.S. PATENT DOCUMENTS

| | | | |
|---|---|---|---|
| 4,906,176 A | 3/1990 | Yamashita et al. | 502/304 |
| 5,260,249 A | 11/1993 | Shiraishi et al. | 423/213.5 |
| 5,412,945 A | 5/1995 | Katoh et al. | 423/213.7 |
| 5,575,983 A | 11/1996 | Suzuki et al. | 423/213.5 |
| 6,093,377 A * | 7/2000 | Iizuka et al. | 423/213.5 |

FOREIGN PATENT DOCUMENTS

| | | |
|---|---|---|
| EP | 613714 | 9/1994 |
| JP | 62-27715 | 12/1987 |
| JP | 1-130735 | 5/1989 |
| JP | 4-219147 | 8/1992 |
| JP | 5-261287 | 10/1993 |

OTHER PUBLICATIONS

Tabata et al.: 68$^{th}$ Shokubai Touronkai 3F108, 3G327 (1991).

* cited by examiner

*Primary Examiner*—Hien Tran
(74) *Attorney, Agent, or Firm*—Kenyon & Kenyon

(57) ABSTRACT

Exhaust gas from internal combustion engines is treated with catalyst comprising an inorganic oxide supporter which supports at least one of noble metals selected from Rh, Pt, and Pd, alkali rare earth metals, rare earth metals, and magnesium in order to remove NOx effectively with superior durability of the catalyst notwithstanding the internal combustion engine is under a stoichiometric operation condition or a lean burning operation condition.

6 Claims, 4 Drawing Sheets

— AFTER REDUCTION
----- AFTER OXIDATION

EXHAUST GAS PURIFYING APPARATUS FOR AN INTERNAL COMBUSTION ENGINE

This is a divisional application of U.S. patent application Ser. No. 08/585,055, filed Jan. 11, 1996, which issued as U.S. Pat. No. 6,093,377 on Jul. 25, 2000.

BACKGROUND OF THE INVENTION

The present invention relates to methods for removing nitrogen oxides effectively from exhaust gas containing the nitrogen oxides such as exhaust gas from internal combustion engines of automobiles etc, exhaust gas from consumers appliance such as cooking apparatus and the like, and exhaust gas from boilers in factories and thermal power stations.

Further, the present invention relates to catalysts for removing nitrogen oxides from the exhaust gas. The catalysts relating to the present invention are preferable for purifying the exhaust gas released from lean burn engines.

Nitrogen oxides (NOx) are contained in exhaust gas released from internal combustion engines of automobiles etc. The nitrogen oxides are harmful to human bodies, and become an origin to destroy a global environment by acid rain etc. Therefore, various catalysts for removing the nitrogen oxides in exhaust gas have been investigated.

Most of catalysts for purifying exhaust gas from automobiles which are under developing at present have been aimed at treating exhaust gas from automobiles wherein a ratio of fuel to air, that is air/fuel by weight, is set at approximately stoichiometric ratio, that is theoretical air to fuel ratio (air/fuel=14.7 by weight). Combustion under the stoichiometric condition generates and releases hydrocarbons and carbon monoxide in addition to the nitrogen oxides. The hydrocarbons and carbon monoxide are also environment contaminating material. Therefore, three way catalyst which can treat the above three substances simultaneously have been a main object of the development. The three way catalyst is a general name for catalysts which can simultaneously treat nitrogen oxides, hydrocarbons, and carbon monoxide in exhaust gas. Most of the three way catalysts contain noble metals such as rhodium, palladium, and platinum as for main components.

However, currently, lean burn engines which burn fuel under a fuel to air ratio (air/fuel) larger than the theoretical fuel to air ratio are becoming a main current as for automobile engines in view of decreasing fuel consumption. With the lean burning, oxygen content in the exhaust gas increases, and an activity of conventional three way catalyst decreases in the presence of the oxygen. Accordingly, nitrogen oxides in the exhaust gas can not be removed effectively. Therefore, development of catalyst for purifying exhaust gas from lean burn engines becomes necessary.

As the catalyst for purifying exhaust gas from lean burn engines, a catalyst which is composed of copper supported by zeolite (JP-A-1-130735 (1989), Proceeding of 68th. Meeting for discussing catalyst, 3F108, (1991)), and a catalyst which is composed of cobalt and rare earth metals supported by zeolite and further at least one of copper and rhodium is supported by the zeolite (JP-A-4-219147 (1992)) are disclosed.

A catalyst which absorbs NOx under a lean burning condition, desorbs the absorbed NOx under a stoichiometric burning condition, and reduces the NOx is disclosed in JP-A-5-261287 (1993). The catalyst is composed of barium oxides, lanthanum oxides, and platinum, all of which are supported by an alumina supporter.

All the above described conventional catalysts for purifying exhaust gas from lean burn engines have such a problem that the catalysts lack a long durability, because all the catalysts contain zeolite. Under the lean burning condition, water is generated approximately 10% by volume by combining hydrocarbons and oxygen in the exhaust gas. Zeolite has such a property that the zeolite loses zeolite structure when it is heated under a condition existing water. Once the zeolite structure is broken, active components supported by the zeolite coagulates, and the catalytic activity decreases.

The catalyst which is composed of barium oxides, lanthanum oxides, and platinum, all of which are supported by an alumina supporter has such a problem that the barium oxides which is contained by a high concentration are thermally deteriorated.

SUMMARY OF THE INVENTION

Accordingly, one of the objects of the present invention is to provide a method for treating exhaust gas to purify effectively the exhaust gas released from lean burning.

Other one of the objects of the present invention is to provide a catalyst which can purify the exhaust gas released lean burning effectively, and has preferable durability.

The method for treating exhaust gas relating to the present invention comprises the process of contacting the exhaust gas flow containing nitrogen oxides with the catalyst in the presence of at least one of hydrocarbons and carbon monoxide to reduce the nitrogen oxides to nitrogen.

The catalyst comprises a structure wherein active components are supported by inorganic oxide supporters, the active components comprises at least one of noble metals selected from rhodium, platinum, and palladium, at least one of rare earth metals, at least one of alkali earth metals, and magnesium. Concentration of the noble metal is in a range of 0.05~3.5 mol % to the inorganic oxides supporter 100 mol %, the rare earth metal is in a range of 0.7~20 mol %, the alkali earth metal is in a range of 4–16 mol %,.rhodium is less than 1.9 mol %, platinum is less than 2.6 mol %, palladium is less than 2.8 mol %, the noble metal is contained in a form of metal or oxide, the rare earth metal is contained in a form of oxide, and the alkali earth metal is contained in a form of oxide or carbonic acid salt.

As the active component for the catalyst of the present invention, the active component composed of rhodium, platinum, cerium, and magnesium is most preferable, and the catalytic activity is maximum.

The catalyst of the present invention is preferably composed of in a manner that the inorganic oxide supporter supports the rare earth metal, the rare earth metal supports the noble metal, and the noble metal supports the alkali earth metal. The catalyst of the above described structure has a preferable dispersibility of noble metal components and a high catalytic activity.

The noble metal components are composed of rhodium and platinum, and the rhodium is preferably supported on the platinum.

In the catalyst of the present invention, the noble metal gives a reaction field for generating $N_2$ from nitrogen oxide and hydrocarbon. By containing alkali earth metal and/or rare earth metal, adsorption of nitrogen oxide at surface of the catalyst is enhanced. Further, the alkali earth metal and the rare earth metal have a strong bonding activity with oxygen, and accordingly, the metals can absorb oxygen in NOx and proceed the catalytic reaction to form $N_2$ even under a condition existing oxygen.

Magnesium in the active components has an effect to enhance the reducing reaction of the nitrogen oxides by increasing crystallinity of the noble metal. The crystallinity of the noble metal can be enhanced by supporting magnesium after supporting the noble metal on the supporter.

When the catalyst is a mixture of particles composed of an inorganic oxide supporter supporting the noble metal, cerium, and magnesium as the active components and particles composed of an inorganic oxide supporter supporting the noble metal, lanthanum, and barium as the active components, the catalyst has a significantly high catalytic activity under both stoichiometric and lean burning operating conditions. The particles composed of an inorganic oxide supporter supporting the noble metal, cerium, and magnesium have a superior performance for purifying the exhaust gas under both stoichiometric and lean burning conditions, and the particles composed of an inorganic oxide supporter supporting the noble metal, lanthanum, and barium have a property to absorb NOx under the lean burning condition. Therefore, the catalytic performance for purifying the exhaust gas can be enhanced by combining the above two kinds of particles, because NOx is absorbed under the lean burning condition and the NOx is released under the stoichiometric burning condition to be reduced to $N_2$.

As for the inorganic oxide supporter, porous oxides such as $TiO_2$, $SiO_2$, $Zro_2$, MgO and the like can be used. Especially, at least one selected from composite oxide of lanthanum and β-alumina (La. β-$Al_2O_3$) and β-alumina (β-$Al_2O_3$) is preferably used.

When treating exhaust gas by the catalyst relating to the present invention, it is preferable to make the catalyst contact alternately with a gas flow of low oxygen concentration wherein an oxygen concentration by volume is set in a range of 1.0~1.7% and a gas flow of high oxygen concentration wherein the oxygen concentration by volume is set higher than that of the gas flow of low oxygen concentration. If the catalyst of the present invention is contacted with the gas flow of high oxygen concentration continuously, an oxide film is generated at surface of the catalyst and activity of the catalyst decreases gradually. Therefore, after contacting the catalyst with the gas flow of high oxygen concentration, subsequently the catalyst is contacted with the gas flow of low oxygen concentration in order to eliminate the oxide film generated at the surface of the catalyst by reacting with hydrocarbon or carbon monoxide. In accordance with the alternate contact with the gas flow of high oxygen concentration and the gas flow of low oxygen concentration, the activity of the catalyst can be maintained at a preferable level for a long time. The time for contacting the catalyst with the gas flow of high oxygen concentration or low oxygen concentration can be respectively from a few tens seconds to a several minutes.

The catalyst of the present invention has preferable performance for purifying exhaust gas under both stoichiometric condition and lean burning condition. Concretely saying, the catalyst of the present invention can reduce nitrogen oxides in the exhaust gas released under the above both conditions to nitrogen effectively by using hydrocarbons and carbon monoxide as reducing agents. Therefore, both hydrocarbons and carbon monoxide can be treated simultaneously.

In accordance with installing the catalyst of the present invention in an exhaust gas system of an internal combustion engine, release of nitrogen oxides to outside the automobile can be suppressed remarkably. Especially, if lean burning and stoichiometric burning are set to be performed alternately, the releasing amount of the nitrogen oxides can be suppressed small for a long time without changing the catalyst.

The catalyst of the present invention is also effective for treating an exhaust gas from diesel engines of diesel automobile and others. The diesel engine is operated with a high air to fuel ratio, that is an oxygen excess condition. However, the catalyst of the present invention has a preferable activity in the presence of oxygen. Therefore, the catalyst of the present invention can remove nitrogen oxides effectively even from an exhaust gas released from a diesel engine.

When cerium is contained in the catalyst of the present invention, the contained amount is preferably in a range from 0.7 mol % to 20 mol % per an inorganic supporter 100 mol %. When magnesium is contained in the catalyst of the present invention, the contained amount is preferably in a range from 4 mol % to 16 mol % per an inorganic supporter 100 mol %.

The catalyst of the present invention can be used in various shapes such as powder, particles, pellets, honeycomb, and others. Furthermore, the catalyst can be used by supported with porous honeycomb such as cordierite honeycomb and metal honeycomb.

The catalyst of the present invention can be prepared by various methods such as impregnation method, kneadering method, coprecipitation method, sol-gel method, and others.

When the catalyst is prepared by the impregnation method, the method comprises preferably the steps of immersing an inorganic oxide supporter into a solution containing rare earth metal compounds, calcining the impregnated supporter, immersing the calcined supporter into a solution containing noble metal compounds, calcining the impregnated supporter, immersing the calcined supporter into a solution containing alkali earth metal compounds, and calcining. In accordance with the above steps, the catalyst can be prepared, wherein the rare earth metals are supported on the inorganic supporter, the noble metals are supported on the rare earth metal, and the alkali earth metals are supported on the noble metals.

As for the metal compounds, various kinds of compounds such as nitrates, acetates, hydrochloride, sulfates, and carbonates can be used.

The catalyst of the present invention has a superior activity in a temperature range from 100° C. to 800° C., especially has a preferable activity in a range of 200° C.~500° C. Accordingly, the temperature whereat the catalyst is contacted with the gas flow, that is a reaction temperature, must be set in the above described temperature range.

DESCRIPTION OF THE PREFERRED EMBODIMENTS

Figure 1:
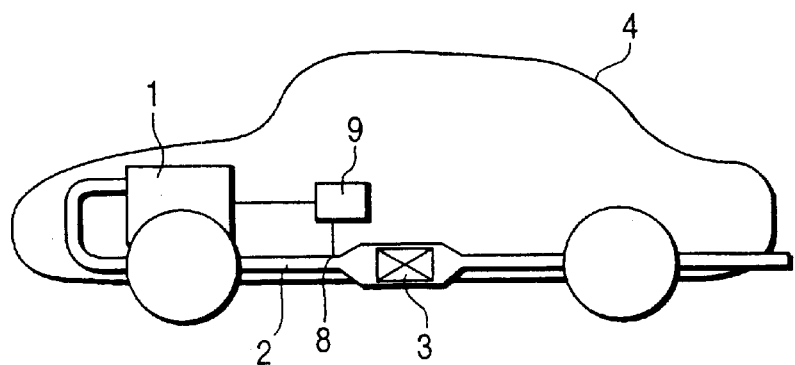
FIG. 1 is a schematic illustration indicating a composition of an automobile provided with the exhaust gas purifying apparatus relating to the present invention.
Figure 2:
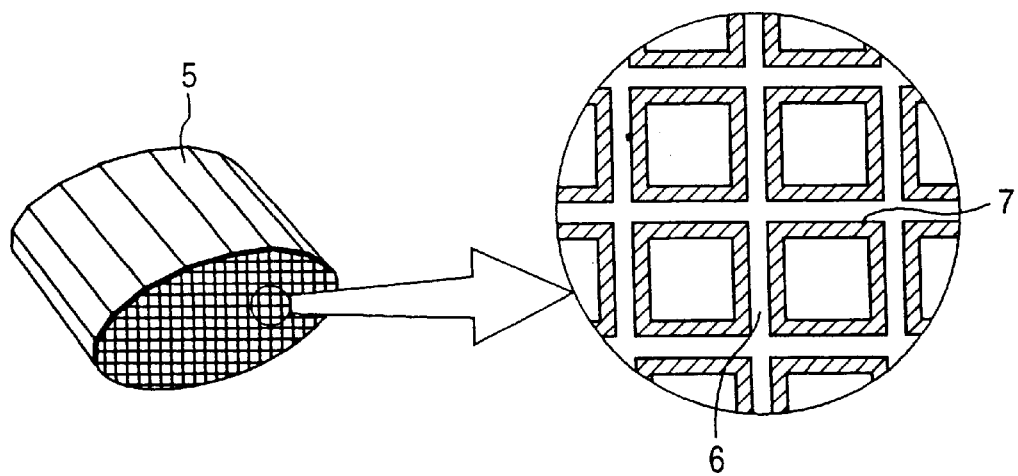
FIG. 2 is a perspective view of an example of honeycomb supporting the catalyst of the present invention.
Figure 3:
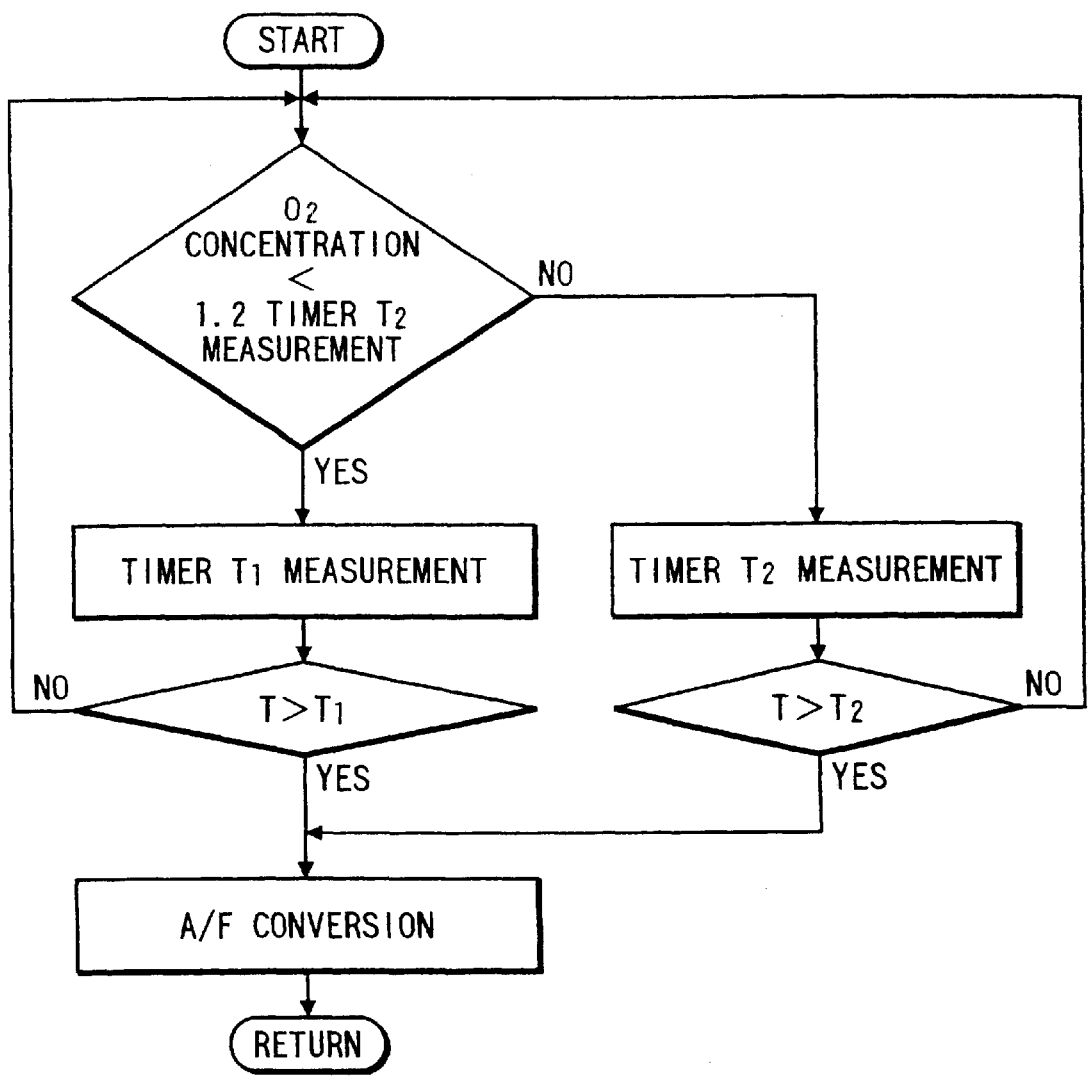
FIG. 3 is a flow chart for controlling air to fuel ratio of an internal combustion engine provided with the catalyst of the present invention.

FIG. 1 indicates an example of the exhaust gas purifying apparatus of the present invention installed in an automobile 4. Referring to FIG. 1, the catalyst 3 is installed at an exhaust gas flow path 2 in the downstream of the engine 1, and an oxygen concentration sensor 8 is provided at upstream of the catalyst 3. The catalyst had a honeycomb structure 5 indicated in FIG. 2, for example, and the catalyst portion 7 is supported at surface of a honeycomb portion 6. An output of the oxygen concentration sensor 8 is transmitted to a computer control portion 9, and operational air to fuel ratio of the engine 1 is controlled by an output of the computer control portion 9. Referring to FIG. 3, when the output of the oxygen sensor is less than a preset oxygen concentration by volume (for instance, 1.2% by volume), operation of the engine 1 is performed with a low air to fuel ratio such as oxygen concentration by volume is less than 1.2% during a setting time of a timer T1, and when the output of the oxygen concentration sensor is equal to or larger than a preset oxygen concentration by volume (for instance, 1.2%.by volume), operation of the engine 1 is performed with a high air to fuel ratio such as oxygen concentration by volume is equal to or larger than 1.2% during a setting time of a timer T2.

Embodiment 1

The catalyst No. 1 of the present embodiment was prepared by a method comprising the following steps;

impregnating a solution containing Ce nitrate aqueous solution into γ-$Al_2O_3$ having a particle size in a range from 1 mm less than 2 mm, drying at about 100° C. for about 2 hours, calcining at about 600° C. for 2 hours, subsequently impregnating a solution containing magnesium nitrate aqueous solution into the calcined body, drying and calcining in a same manner as above, further orderly impregnating aqueous solutions of rhodium nitrate, and dinitrodiamine platinum nitrate, and drying and calcining in a same manner as above.

The catalyst No. 1 of the present embodiment prepared by the above steps contained Rh 0.29 mol % (0.3% by weight), Pt 0.82 mol % (1.6% by weight), Mg 8 mol % (2% by weight), and Ce 16.4 mol % (23% by weight) per γ-$Al_2O_3$ 100 mol %, respectively.

In accordance with the same method except replacing Mg with other alkali earth metals and replacing Ce with other rare earth metals, the catalysts No. 2–9 of the present embodiment were obtained.

Compositions of the prepared catalysts are summarized in Table 1.

TABLE 1

| Catalyst number | Active component (mol %) | | | | |
|---|---|---|---|---|---|
| | Noble metals | | Alkali earth metals | | Rare earth metals |
| (No.) | Rh | Pt | Mg | Others | |
| Cat. No. 1 | 0.29 | 0.82 | 8 | | Ce 16.4 |
| Cat. NO. 2 | 0.29 | 0.82 | 8 | | La 16.4 |
| Cat. No. 3 | 0.29 | 0.82 | 8 | Ca 8 | La 16.4 |
| Cat. NO. 4 | 0.29 | 0.82 | 8 | Sr 8 | La 16.4 |
| Cat. No. 5 | 0.29 | 0.82 | 8 | Ba 8 | Ce 16.4 |
| Cat. NO. 6 | 0.29 | 0.82 | 8 | Ba 8 | Nd 16.4 |
| Cat. No. 7 | 0.29 | 0.82 | 8 | Ba 8 | La 16.4 |
| Cat. NO. 8 | 0.29 | 0.82 | 8 | Ba 8 | Ce 16.4 |
| Cat. NO. 9 | 0.29 | 0.82 | 8 | Ba 8 | La 16.4 |

(Experiment 1)

Experiments on nitrogen oxides removing performance of the catalysts No. 1–9 of the present embodiment were performed by the following method.

Experimental Method (1) The catalyst 3 $cm^3$ was filled into a reaction tube made of pylex glass.

(2) The reaction tube was inserted into an electric furnace, and heated to 550° C. with a temperature increasing rate of 10° C./min. When the temperature of the catalyst reached at 150° C., flow of stoichiometric model gas (called hereinafter stoichiometric model exhaust gas) was started. Nitrogen oxides (NOx) in the exhaust gas from the reaction tube was determined by chemiluminescence method at every 30 seconds.

As for the stoichiometric model exhaust gas, a gas composed of NO 0.1% by volume, $C_3H_6$ 0.05% by volume, CO 0.6% by volume, $O_2$ 0.6% by volume, steam 10% by volume, and the residual nitrogen was used. Space velocity of the gas was 60,000 $h^{-1}$. The determination of the temperature was performed by a thermocouple which was installed at the vicinity of the catalytic layer in the reaction tube.

(3) When the temperature of the catalyst reached at 550° C., the flow of the stoichiometric model exhaust gas was stopped.

(4) Heating by the electric furnace was stopped, and the catalyst was cooled to 300° C.

(5) Subsequently, flow of lean burning model gas (called hereinafter lean model exhaust gas) was started. Nitrogen oxides (NOx) in the exhaust gas from the reaction tube was determined by chemiluminescence method at every 30 seconds.

As for the lean model exhaust gas, a gas composed of No 0.06% by volume, $C_3H_6$ 0.04% by volume, CO 0.1% by volume, $CO_2$ 10% by volume, $O_2$ 4% by volume, steam 10% by volume, and the residual nitrogen was used. Space velocity of the gas was 60,000 $h^{-1}$.

(6) After flowing the lean model exhaust gas for 30 minutes, the flow of the gas was stopped and the experiment was completed.

NOx removal rates after flowing the lean model exhaust gas for 30 minutes are indicated in Table 2.

The NOx removal rate was calculated by the following equation;

NOx removal rate=(NOx concentration in the gas at the inlet—NOx concentration in the gas at the outlet)/(NOx concentration in the gas at the inlet)

TABLE 2

| | NOx Removal rate (%) |
|---|---|
| Catalyst No. 1 | 40 |
| Catalyst No. 2 | 30 |
| Catalyst No. 3 | 37 |
| Catalyst No. 4 | 18 |
| Catalyst No. 5 | 35 |
| Catalyst No. 6 | 30 |
| Catalyst No. 7 | 15 |
| Catalyst No. 8 | 30 |
| Catalyst No. 9 | 20 |

(Experiment 2)

Experiments on nitrogen oxides removing performance of the catalysts No. 1–9 of the present embodiment were performed by the following steps.

(1) The same steps as the experiment 1 were performed until the flow of the stoichiometric model exhaust gas was stopped.

(2) Heating by the electric furnace was stopped, and the catalyst was cooled to 150° C.

(3) Flow of the lean model exhaust gas was started, and the heating by the electric furnace was re-started simultaneously. Nitrogen oxides (NOx) in the exhaust gas from the reaction tube was determined by chemiluminescence method when the catalyst temperature reached at 250° C., 300° C., and 400° C., respectively.

As for the lean model exhaust gas, the same gas as used in the experiment 1 was used. Space velocity of the gas was 60,000 h$^{-1}$. The temperature increasing rate of the reaction tube by the electric furnace was 10° C./min.

(4) When the temperature of the catalyst reached at 550° C., the flow of the gas was stopped and the experiment was completed.

NOx removal rates at respective measuring temperature are indicated in Table 3. The NOx removal rate was calculated by the same equation as the experiment 1.

TABLE 3

| Reaction temperature (° C.) | NOx removal rate (%) | | |
|---|---|---|---|
| | 250 | 300 | 400 |
| Catalyst No. 1 | 63 | 57 | 20 |
| Catalyst No. 2 | 57 | 54 | 33 |
| Catalyst No. 3 | 63 | 63 | 32 |
| Catalyst No. 4 | 58 | 63 | 35 |
| Catalyst No. 5 | 65 | 67 | 25 |
| Catalyst No. 6 | 50 | 45 | 20 |
| Catalyst No. 7 | 55 | 45 | 28 |
| Catalyst No. 8 | 35 | 40 | 40 |
| Catalyst No. 9 | 45 | 45 | 40 |

TABLE 4

| Temperature (° C.) | NOx removal rate (%) After heating treatment at 700° C. |
|---|---|
| 200 | 5 |
| 250 | 70 |
| 300 | 58 |
| 400 | 18 |

(Experiment 3)

In order to examine heat resistance of the catalyst of the present invention, the catalyst No. 1 of the present embodiment was heated at 700° C., for 50 hours in a calcining furnace. Subsequently, the catalyst was cooled to room temperature, and was taken out from the furnace. Then, the catalyst was filled into a reaction tube, and the lean model exhaust gas was flown as same as experiment 2. The observed NOx removal rates are shown in Table 4, and durability of the catalyst relating to the present invention was revealed to be preferable at high temperature.

(Experiment 4)

Using the catalyst No. 7 of the present embodiment, an experiment on NO release at an elevated temperature was performed as follows.

First, the catalyst 2 cm$^3$ was filled into a reaction tube, and the reaction tube was heated gradually to 600° C. in CO-He gas flow in order to reduce and eliminate oxygen which was absorbed on the catalyst. Because oxygen was absorbed on the surface of the catalyst which had just been prepared, it was necessary to reduce and eliminate the oxygen at the surface of the catalyst as a pre-treatment. After being kept at 600° C. in He gas flow for 20 minutes, the reaction tube was cooled to 50° C. in O$_2$—He gas flow, and kept at 50° C. more than one hour for contacting the catalyst with oxygen. Subsequently, NO was absorbed saturately by flowing NO—He gas flow, then the catalyst was heated to 500° C. in He gas flow for desorbing the absorbed gas. During the desorption, components in the gas flow at outlet of the reaction tube was determined by a quadruple mass spectrometer, and a result shown in FIG. 4 was obtained.

Figure 4:
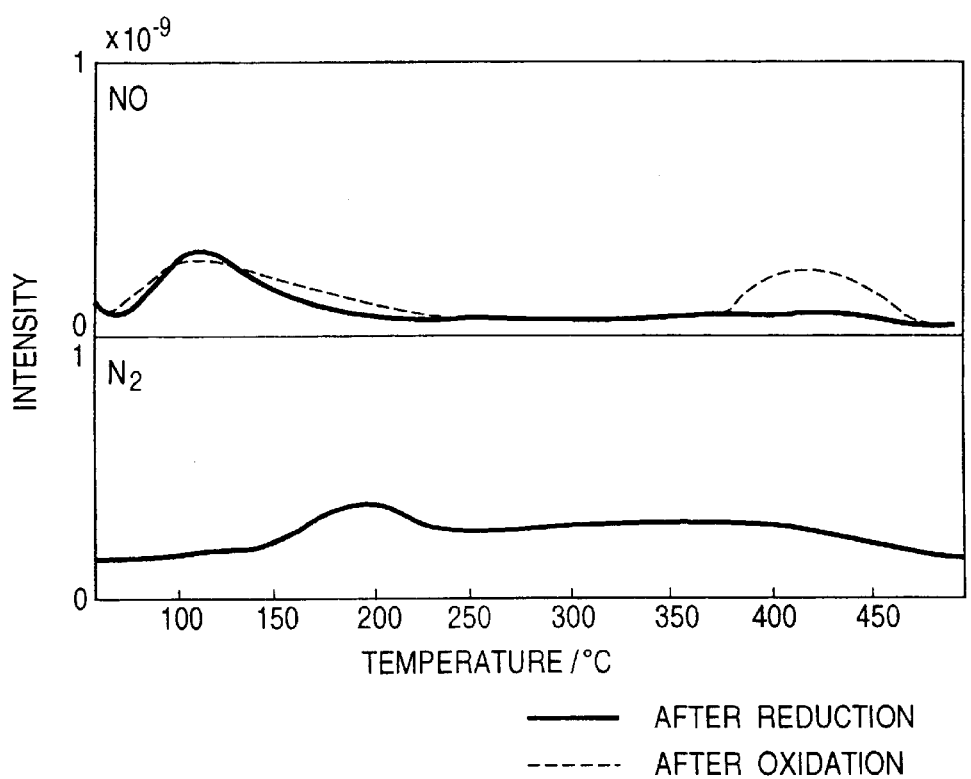
FIG. 4 is graph indicating a result of releasing experiment of NO adsorbed on surface of the catalyst, FIGS. 5(*a*), 5(*b*), and 5(*c*) indicate results of evaluation on transient response characteristics of the catalyst relating to the present invention.

Referring to FIG. 4, release of NO is observed at temperature ranges of 100° C.~470° C. and 100° C.~250° C., but generation of N$_2$ is hardly observed. The result indicates that the reactivity of the catalyst with NOx is decreased by covering the surface of the catalyst with oxygen.

Figure 5A:
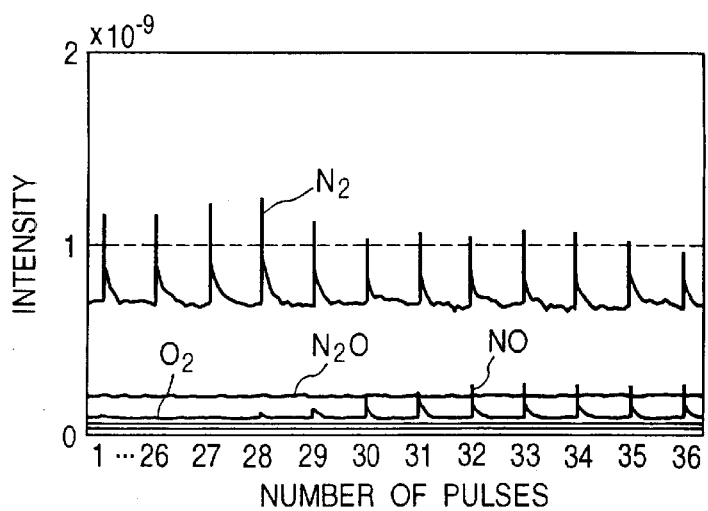
Figure 5B:
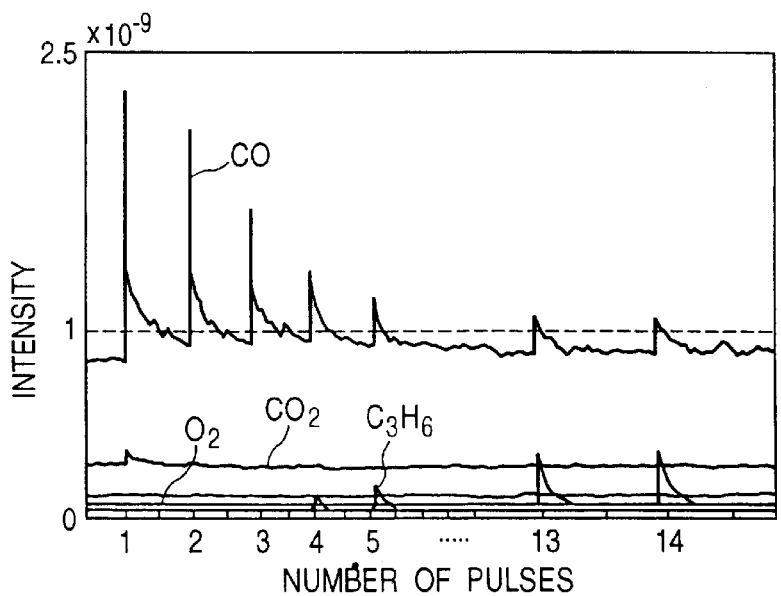
Figure 5C:
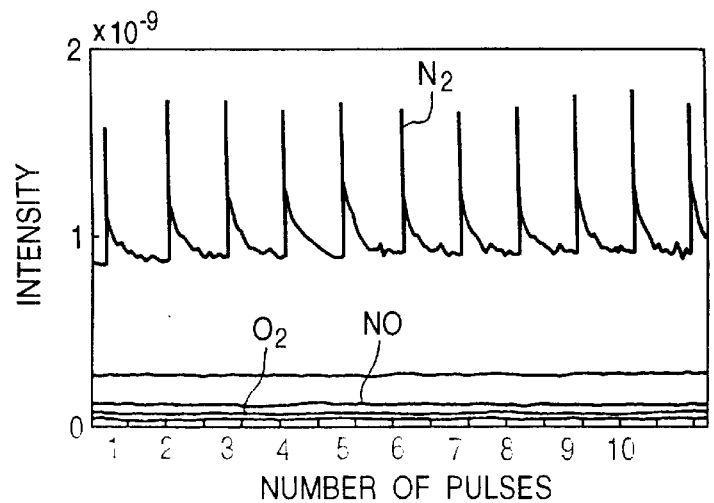

Furthermore, transient response reaction characteristics was evaluated with the above catalyst. First, the catalyst sample 0.5 grams was filled into a reaction tube, and the reaction tube was heated to 600° C. in CO—He gas flow as same as the previous NO release experiment at an elevated temperature. The reaction tube was kept at 600° C. in He gas flow for 20 minutes, then cooled to 300° C. and maintained the temperature. (a) NO 70 ppm, (b) C$_3$H$_6$ 250 ppm, (c) NO 70 ppm were introduced into He gas flow in a pulsing manner, components in the gas flow at outlet of the reaction tube was determined by a quadruple mass spectrometer, and a result shown in FIGS. 5(a), 5(b), and 5(c) was obtained. The result can be summarized as follows.

(a) Only N$_2$ was observed until the 27th NO pulse, and no oxygen (O$_2$) was generated.

After the 28th NO pulse, NO was observed. Therefore, it is revealed that reducing the NO to N$_2$ is started at this point at the surface of the catalyst which is not covered with oxygen, and NO removing performance of the catalyst decreases in accordance with a degree of oxygen accumulation at the surface of the catalyst.

(b) In accordance with introducing C$_3$H$_6$ into He gas flow in a pulsing manner, CO was observed. After 4th introduction, C$_3$H$_6$ was observed. The observed result indicates that the surface oxygen reacts with hydrocarbon and active points of the catalyst is recovered.

(c) Only generation of N$_2$ was observed in accordance with introduction of No in a pulsing manner. The result indicates that a reducing reaction of NO to N$_2$ occurs at the surface of the catalyst, and N$_2$ is generated.

In accordance with the above experimental results, it is revealed that elimination of oxygen from the surface of the catalyst is important for removing NOx.

Comparative Example 1

Comparative example catalyst No. 1 containing Rh 0.29 mol % (0.3% by weight), Pt 0.82 mol % (1.6% by weight), and Ce 16.4 mol % per γ-Al$_2$O$_3$ 100 mol % was prepared by the same method as the embodiment 1.

Nitrogen oxides removing performance of the comparative example catalyst No. 1 was performed by the same method as the experiment 2 in the embodiment 1. The obtained result is indicated in Table 5.

Embodiment 2

Embodiment catalyst No. 10 was prepared by the same method as the embodiment 1. Composition of the catalyst was Pd 1.5 mol % (1.6% by weight), Rh 0.29 mol % (0.3% by weight), Mg 8 mol % (2% by weight), and Ce 16.4 mol % (23% by weight). Performance of the catalyst was evaluated by the same method as the experiment 2 in the embodiment 1. The obtained result is indicated in Table 6.

Embodiment 3

The catalyst No. 11 of the present embodiment was prepared by a method comprising the following steps;

impregnating a solution containing Ce nitrate aqueous solution into γ-Al$_2$O$_3$ having a particle size in a range from 1 mm less than 2 mm, drying at about 100° C. for about 2 hours, calcining at about 600° C. for 2 hours, orderly impregnating aqueous solutions of rhodium nitrate, and dinitrodiamine platinum nitrate, and drying and calcining in a same manner as above.

Further, impregnating a solution containing magnesium nitrate aqueous solution, drying at about 100° C. for about 2 hours, and calcining at about 600° C., for 2 hours.

That is, Mg was supported at the outermost layer of the components. The catalyst No. 11 of the present embodiment prepared by the above steps contained Rh 0.29 mol % (0.3% by weight), Pt 0.82 mol % (1.6% by weight), Mg 4 mol % (1% by weight), and Ce 8.6 mol % (12% by weight) per γ-$Al_2O_3$ 100 mol %, respectively.

In accordance with the same method as above, comparative example catalyst No. 2 supporting Mg after Ce contained Mg 4 mol % and Ce 8.6 mol % (No Rh nor Pt contained) was prepared.

Performance of the above catalysts were evaluated by the same method as the experiment 2 of the embodiment 1. The obtained results on NOx removal rate are indicated in Table 7. The embodiment catalyst No. 11 wherein Mg is supported after noble metal supporting has a higher NOx removal rate than the embodiment catalyst NO. 1.

TABLE 5

| Reaction temperature | NOx Removal rate (%) | | |
|---|---|---|---|
| (° C.) | 250 | 300 | 400 |
| Comparative example catalyst No. 1 | 45 | 45 | 15 |

TABLE 6

| Temperature (° C.) | NOx removal rate (%) |
|---|---|
| 200 | 30 |
| 250 | 35 |
| 300 | 24 |
| 400 | 15 |
| 500 | 5 |

TABLE 7

| | NOx removal rate (%) | |
|---|---|---|
| Temperature (° C.) | Embodiment catalyst No. 11 | Comparative example catalyst No. 2 |
| 200 | 75 | 0 |
| 250 | 65 | 0 |
| 300 | 53 | 15 |
| 400 | 15 | 30 |

Embodiment 4

Embodiment catalyst No. 12 was obtained by washcoating of the embodiment catalyst No. 1 (100 grams per liter) onto cordierite honeycomb (400 cells/$in^2$), and calcining the coated cordierite honeycomb at 600° C. for 2 hours.

NOx removal rate of the embodiment catalyst No. 12 having an area of 6 $cm^2$ (17 mm×21 mm) was determined by inserting the catalyst into a pylex reaction tube of 28 mm inner diameter, and flowing stoichiometric model exhaust gas and lean burning model exhaust gas alternately by the same method as the experiment 1. The space velocity SV of the lean burning model exhaust gas was 30,000 $h^{-1}$.

A gap between an outer wall of the honeycomb and the reaction tube was closed by packing quartz wool. A thermocouple was provided at upper portion by 1 cm from the upper surface of the honeycomb for measuring temperature.

In the present experiments, oxygen concentration in the lean burning model exhaust gas was changed respectively as 0, 0.5, 1.0, 1.2, 1.5, 1.7, 5.0% by volume.

Figure 6:
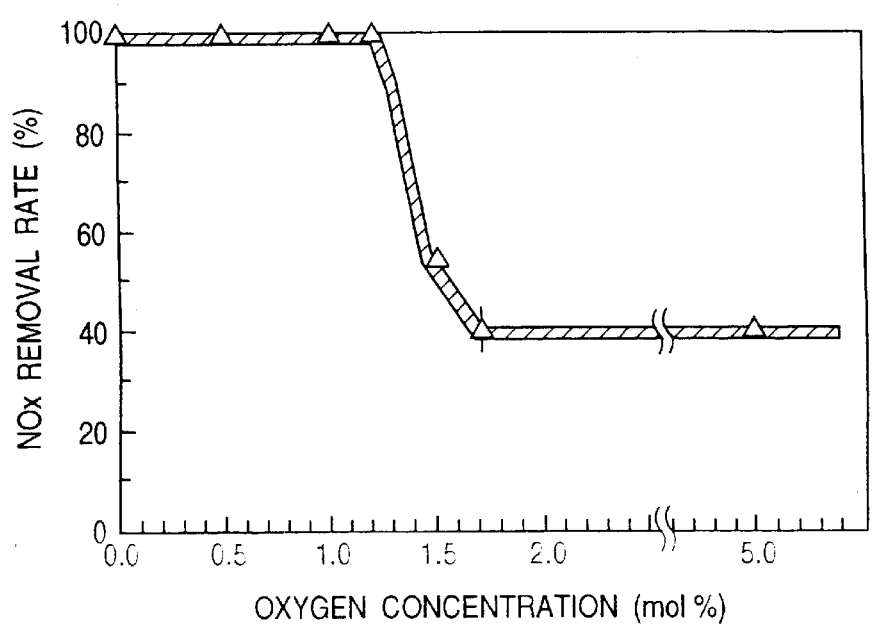
FIG. 6 is a graph indicating a relationship between oxygen concentration and NOx removal rate.

FIG. 6 indicates NOx removal rates after flowing the lean burning model exhaust gas for 30 minutes. The NOx removal rate was calculated by the same equation as the embodiment 1. The NOx removal rate when the oxygen concentration was in a range of 1.0~1.4% by volume was approximately 100%.

Embodiment 5

Embodiment catalyst NO. 13 was obtained by coating 300 grams of the embodiment catalyst No. 1 onto cordierite honeycomb of volume 1.7 liters. The honeycomb catalyst was installed under a floor of automobile having an engine of 3000 $cm^3$ displacement, and NOx removal rate was determined under driving the automobile by 10–15 modes.

The NOx removal rate under stoichiometric operation (air/fuel ratio=14.7) was approximately 100%, and the NOx removal rate under lean burning operation (air/fuel ratio=21) was approximately 50%.

Subsequently, the embodiment catalyst NO. 13 was inserted into a reaction tube, and heated to 300° C. The NOx removal rate was determined under a condition maintaining the reaction tube at 300° C. and flowing the stoichiometric model exhaust gas and the lean burning model exhaust gas alternately by 3 minutes for one hour totally.

Respective of the stoichiometric model exhaust gas and the lean burning model exhaust gas had the same composition as the gases used in the experiment 1.

The NOx removal rate under stoichiometric condition was always approximately 100%, and the NOx removal rate under lean burning condition was in a range of 50~100%. The NOx removal rate soon after alteration from the stoichiometric gas to the lean burning gas was approximately 100%, but the rate decreased to approximately 50% after continuing the lean burning condition for 3 minutes. During the experiment for one hour, the NOx removal rate repeated the above explained change, and no extreme decrease of the NOx removal rate under the stoichiometric condition was observed.

Embodiment 6

Embodiment catalyst No. 14 was prepared in accordance with the same method as the embodiment 1, except using a composite oxide (La. β-$Al_2O_3$) supporter made of β-$Al_2O_3$ and Lanthanum in place of γ-$Al_2O_3$ supporter. The NOx removal rates were calculated based on NOx which were determined in accordance with the same method as the experiment 2, such as flowing the stoichiometric model exhaust gas and the lean burning model exhaust gas alternately, and measuring the amount of NOx in the gas stream when the lean burning model exhaust gas was flowing and the temperature indicated by the thermocouple reached at respectively 200° C., 250° C., 300° C., 400° C., and 500° C. The same experiment as above was also performed on the catalyst which was obtained by thermal treatment of the embodiment catalyst No. 14 at 700° C. for 50 hours in a calcining furnace.

Composition of the embodiment catalyst No. 14 was Rh 0.29 mol % (0.3% by weight), Pt 0.82 mol % (1.6% by weight), Mg 8 mol % (2% by weight), and Ce 16.4 mol % (23% by weight). Table 8 indicates the NOx removal rate of the catalyst No. 14.

Embodiment 7

A mixture of γ-$Al_2O_3$ of 1 μm in diameter and cerium nitrate was prepared by the steps of wet-kneadering, drying at approximately 100° C., for approximately 2 hours, and calcining at approximately 600° C. for 1 hour. Subsequently, respective aqueous solutions of rhodium nitrate and dinitrodiamine platinum were added to the mixture orderly, and kneadering, drying, and calcining were performed as same as the above procedure. Finally, magnesium nitrate was added to the mixture by wet-kneadering, drying at approximately 100° C. for approximately 2 hours, and calcining at approximately 600° C. for 1 hour. In accordance with the above steps, embodiment catalyst NO. 15 was obtained. Composition of the embodiment catalyst No. 15 was Rh 0.29 mol % (0.3% by weight), Pt 0.82 mol % (1.6% by weight), Mg 4 mol % (1% by weight), and Ce 8.6 mol % (12% by weight) per $\gamma$-$Al_2O_3$ 100 mol %.

In accordance with the same method as the embodiment catalyst NO. 15, comparative example catalyst No. 3, wherein $\gamma$-$Al_2O_3$ of 1 $\mu$m in diameter supported Lanthanum, barium, and platinum orderly, was obtained. Composition of the comparative example catalyst No. 3 was La 0.17 mol %, Ba 0.08 mol %, and Pt 1.6 mol %.

Furthermore, embodiment catalyst NO. 16 was prepared by the steps of dry-mixing the embodiment catalyst No. 15 and the comparative example catalyst No. 3 in a ratio of 1:1 by weight, fabricating by pressing machine, granulating to particles of 1~2 mm in diameter, and calcining at approximately 600° C., for 1 hour.

Using the three kinds of catalysts obtained by the above described procedure, the amounts of NOx were determined by the same method as the experiment 2, and the NOx removal rates were calculated. The obtained results are shown in Table 9.

Embodiment 8

Using the embodiment catalyst No. 11, various catalyst were prepared, wherein content of Ce, Mg, Pt, and Rh were altered respectively to ranges of Ce 0~25 mol %, Mg 0~16 mol %, Pt 0~1.54 mol %, and Rh 0~0.48 mol %. Then, NOx removal rates were determined by the same method as the experiment 1. The results are shown in Table 10.

TABLE 8

| Temperature (° C.) | NOx removal rate (%) | |
|---|---|---|
| | Embodiment catalyst No. 14 | After heat treatment at 700° C. |
| 200 | 45 | 44 |
| 250 | 50 | 50 |
| 300 | 45 | 40 |
| 400 | 20 | 17 |
| 500 | 10 | 10 |

TABLE 9

| | NOx removal rate (%) | | | | |
|---|---|---|---|---|---|
| | 200° C. | 250° C. | 300° C. | 350° C. | 400° C. |
| Embod. catalyst No. 15 | 40 | 55 | 45 | 35 | 15 |
| Compara. catalyst No. 3 | 35 | 40 | 40 | 45 | 40 |
| Embod. catalyst No. 16 | 50 | 65 | 83 | 70 | 25 |

Remarks: Embod.; Embodiment, Compara.; Comparative example

TABLE 10

| Rh (mol %) | Pt (mol %) | Mg (mol %) | Ce (mol %) | | | |
|---|---|---|---|---|---|---|
| | | | 0 | 8 | 17 | 25 |
| 0 | 0 | 0 | 3 | 5 | 7 | 6 |
| | | 4 | 5 | 10 | 12 | 10 |
| | | 8 | 5 | 12 | 13 | 12 |
| | | 16 | 5 | 13 | 13 | 12 |
| 0.097 | 0.26 | 0 | 15 | 25 | 28 | 20 |
| | | 4 | 16 | 31 | 35 | 28 |
| | | 8 | 18 | 32 | 36 | 30 |
| | | 16 | 15 | 28 | 30 | 25 |
| 0.29 | 0.82 | 0 | 20 | 36 | 38 | 31 |
| | | 4 | 25 | 42 | 38 | 30 |
| | | 8 | 25 | 37 | 42 | 30 |
| | | 16 | 18 | 31 | 33 | 30 |
| 0.48 | 1.54 | 0 | 10 | 15 | 18 | 15 |
| | | 4 | 15 | 25 | 25 | 20 |
| | | 8 | 18 | 24 | 26 | 18 |
| | | 16 | 10 | 20 | 22 | 15 |

What is claimed is:

1. An exhaust gas purifying apparatus for an internal combustion engine comprising:

a catalyst for removing nitrogen oxides provided in a flow path of gas exhausted from said engine, wherein lean burning and stoichiometric burning are performed alternately, and wherein said catalyst comprises a mixture of:

first particles composed of an inorganic oxide supporter supporting active components comprising rhodium, platinum, magnesium and cerium; and second particles composed of an inorganic oxide supporter supporting active components comprising platinum, barium, and lanthanum;

and, a controller for setting an operational air-to-fuel ratio within said engine so that an oxygen concentration in volume in a gas as exhausted from said engine becomes a predetermined value in the range of 1.0–1.7% during stoichiometric burning, and said oxygen concentration during lean burning becomes a predetermined value higher than said oxygen concentration determined during said stoichiometric burning.

2. An exhaust gas purifying apparatus for an internal combustion engine comprising:

a catalyst for removing nitrogen oxides provided in a flow path of gas exhausted from said engine, wherein lean burning and stoichiometric burning are performed alternately, and wherein said catalyst comprises a mixture of:

first particles composed of an inorganic oxide supporter supporting active components comprising rhodium, platinum, magnesium and cerium; and second particles composed of an inorganic oxide supporter supporting active components comprising platinum, barium, and lanthanum.

3. An exhaust gas purifying apparatus for an internal combustion engine comprising:

a catalyst for removing nitrogen oxides in a flow path of gas exhausted from said engine, and a controller which controls an operational air-to-fuel ratio and an operational time interval so that lean burning gas and stoichiometric burning gas are contacted alternately with said catalyst for removing nitrogen oxides, wherein said catalyst comprises a mixture of:

first particles composed of an inorganic oxide supporter supporting active components comprising rhodium, platinum, magnesium and cerium; and second particles composed of an inorganic oxide supporter supporting active components comprising platinum, barium, and lanthanum.

4. An exhaust gas purifying apparatus for an internal combustion engine as claimed in claim 3, wherein;

a first value of oxygen concentration in volume in the gas exhausted from said engine, which is predetermined as a value in the range of 1.0–1.7%, a time for maintaining said first value, a second value of oxygen concentration in volume higher than said first value, and a time for maintaining said second value are set as setting conditions with said controller, and said controller controls said engine so as to maintain said setting conditions.

5. An exhaust gas purifying apparatus for an internal combustion engine as claimed in claim 4, wherein;

said controller judges said oxygen concentration in volume in the gas exhausted from said engine whether it is in said predetermined first value or said second value based on an observed value of oxygen concentration determined by an oxygen concentration sensor provided at the vicinity of an inlet of said catalyst for removing nitrogen oxides in said flow path of said gas exhausted from said engine.

6. A nitrogen oxides removing catalyst for an internal combustion engine, which is provided in a gas flow path of said internal combustion engine for removing nitrogen oxides in a gas exhausted from said internal combustion engine, wherein lean burning and stoichiometric burning are performed alternately; and wherein said catalyst comprises a mixture of:

first particles composed of an inorganic oxide supporter supporting active components comprising rhodium, platinum, magnesium and cerium; and second particles composed of an inorganic oxide supporter supporting active components comprising platinum, barium, and lanthanum.

* * * * *

UNITED STATES PATENT AND TRADEMARK OFFICE
CERTIFICATE OF CORRECTION

PATENT NO. : 6,517,784 B1
DATED : February 11, 2003
INVENTOR(S) : Hidehiro Iizuka et al.

It is certified that error appears in the above-identified patent and that said Letters Patent is hereby corrected as shown below:

Column 2,
Line 35, change "mol %,.rhodium" to -- mol %, rhodium --.

Column 3,
Line 19, change "Zro$_2$" to -- ZrO$_2$ --.

Column 6,
Line 27, change "composed of No" to -- composed of NO --.

Column 7,
Line 64, change "100º C.~470º C. and 100º C.~250º C.," to
-- 100º C.~250º C. and 370º C.~470º C., --.

Signed and Sealed this

Thirtieth Day of December, 2003

JAMES E. ROGAN
*Director of the United States Patent and Trademark Office*